United States Patent [19]
Kunstadt

[11] Patent Number: 5,131,029
[45] Date of Patent: Jul. 14, 1992

[54] CELLULAR CAR TELEPHONE DIALING CONTROLLER

[76] Inventor: George H. Kunstadt, 4450 La Barca Dr., Tarzana, Calif. 91356

[21] Appl. No.: 571,509

[22] Filed: Aug. 23, 1990

[51] Int. Cl.$^5$ .............................................. H04M 1/64
[52] U.S. Cl. ...................... 379/355; 379/58; 379/68
[58] Field of Search .................. 379/387, 355, 360, 75, 379/58, 67, 68

[56] References Cited

U.S. PATENT DOCUMENTS

| | | | |
|---|---|---|---|
| 4,517,413 | 5/1985 | Pavitt, Jr. | 379/75 X |
| 4,658,097 | 4/1987 | D'Agosto, III et al. | 379/75 |
| 4,731,811 | 3/1988 | Dubus | 379/355 X |
| 4,908,845 | 3/1990 | Little | 379/355 X |
| 5,048,074 | 9/1991 | Dugdale | 379/360 X |

Primary Examiner—James L. Dwyer
Assistant Examiner—M. Shehata

[57] ABSTRACT

A cellular telephone dialing controller comprising an operator switch, a state machine, digitally stored audio prompts, and a Dual Tone Multi-Frequency signal generator, in which at each dialing step the operator hears sequentially the numerals zero, one, etc. and the operator "dials" by closing the operator's switch when the proper number is played. At completion of "dialing" the entire phone number is audibly replayed for operator approval, after which the call is automatically initiated, including the generation of Dual Tone Multi-Frequency as well as Off-Hook/On-Hook control signals, the entire dialing operation being completed without visual participation or use of the operator's hands, thereby ensuring driving safety.

5 Claims, 1 Drawing Sheet

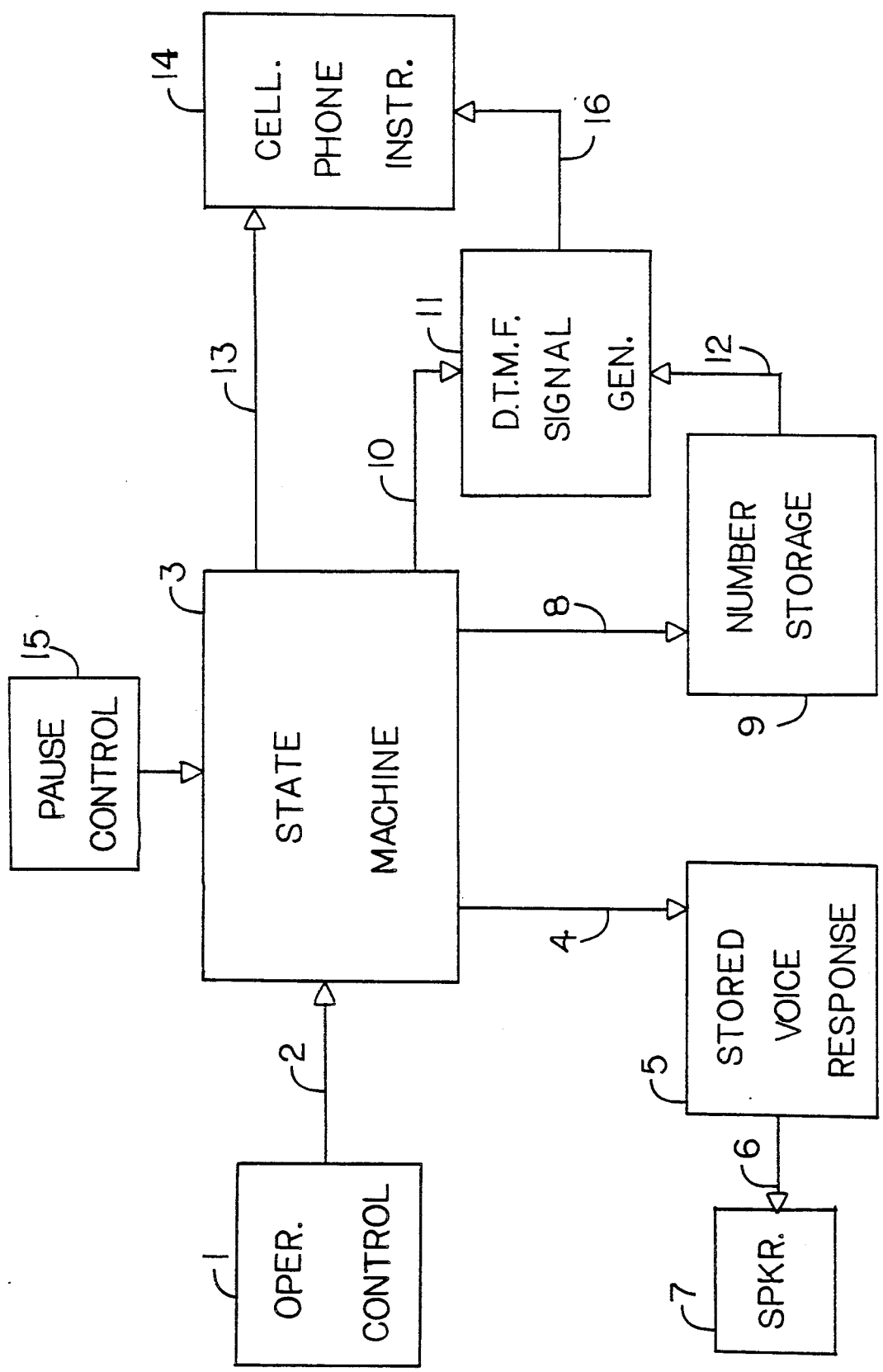

CELLULAR CAR TELEPHONE DIALING CONTROLLER

BACKGROUND OF THE INVENTION

The invention relates to the process of dialing a telephone number without having to look at the dialing instrument or having to touch it while dialing. This feature is expected to be very useful in the practice of cellular telephony in moving automobiles. The driver should not take his eyes off the road or his hands off the steering wheel. There are documented cases of automobile accidents caused by drivers dialing their cellular telephones while driving. In some states (e.g. Minnesota) laws are now being proposed that would make dialing while driving unlawful. Hands-free-while talking phone systems are available, but dialing causes a distraction. Some systems are in use to minimize the distraction, such as installing the phone on the sun visor, or supplying a touch screen dialer with extra-large numbers near the steering wheel. Voice recognition systems are also under consideration, but these may react differently to different drivers (e.g. male or female), and they may be affected by disturbing noises.

SUMMARY OF THE INVENTION

The principle of the invention is in the employment of an audio interactive process between the operator and the controller to establish the telephone number the operator wishes to dial. In this interactive process the operator activates switch closures at certain times, and the controller issues audio voice prompts, establishes the desired phone number to dial, and when the interactive process is completed initiates the phone call by generating proper On-Hook and Off-Hook telephone supervisory signals, and the correct Dual Tone Multi-Frequency (touch tone) signals. When the called party line ringing commences the operator takes over use of the telephone instrument in the regular fashion.

DESCRIPTION OF THE DRAWING

The drawing shows the cellular car telephone dialing controller in block diagram form.

DESCRIPTION OF THE PREFERRED EMBODIMENT

Refering to the drawing we see an operator control 1, which can be as simple as a spring loaded momentary ON push button switch, preferably mounted on the floor board for left-foot control to minimize distraction and interference with the act of driving. Operator control 1 is electrically connected to state machine 3 by cable 2. The state machine comprises electrical circuits which when latched in a specific combination uniquely represent one specific step in the process of dialing and initiating the call. The sequence in which these unique states are progressively assumed is determined by the inputs from the operator control 1, as well as built-in timers which measure the relative time of arrival of switch closures. The state machine 3 has several outputs. One of these outputs is line 4 which connects to a stored voice response circuit 5. As will be shown later 5 is constructed out of commercially available integrated circuits, because it needs to store only a limited vocabulary. If the voice signal is stored in straight digital (e.g. pulse code modulation) format toll quality speech requires 64,000 bits of memory per second of stored speech. In the prefered embodiment the speech is synthesized by simulating the main elements of the human vocal tract together with some encoding such as Liear Predictive Coding. Thus, one second of good quality speech requires only 2000 bits. The prefered embodiment requires a vocabulary of less than 20 seconds, or 40,000 bits of storage. The commercial IC part number TSP 50C41 from Texas Instruments incorporates 64,000 bits of storage, sufficient for 32 seconds of speech. In the preferred embodiment the total vocabulary in stored voice response unit 5 is 20 seconds, as follows:

1. "Ready to Dial"
2. "Ready to Speed Dial"
3. "Zero"
4. "One"
5. "Two"
   .etc.
   .etc.
12. "Nine"
13. "The number is"
14. "Push button to proceed"

The stored voice response unit 5 drives a speaker 7 via cable 6. The speaker 7 may actually be the speaker installed in the car radio, or it may be a separate unit.

The state machine 3 drives number storage unit 9 via cable 8. As the state machine 3 determines which series of numbers to dial, they are stored in electrical registers in the number storage unit 9. Numbers are stored in binary coded decimal code in a small commercial integrated circuit static random access memory. Cable 8 carries information concerning sequential position of a number (whether it is first, second etc.) as a memory location address, and the actual number to be dialed in a four bit address location. Thus even a very long telephone number requires only a very small random access memory. Number storage unit 9 is also the place to store frequently called numbers (speed dialing). It can be pre-programmed with a small group of telephone numbers to shorten the time to initiate a call. Speed dialing is also often referred to as "Memory Dialing". For example in a 10-number speed dialing system any number can be accessed with only one decimal digit.

Cable output 10 drives Dual Tone Multi-Frequency signal generator 11. When the state machine 3 has determined that the time has come to initiate the call, this generator 11 is activated via cable 10, while state machine 3 puts out a memory location via cable 8 to cause number storage unit 9 to put on cable 12 the number to be dialed. Cable 16 is the audio output from the DTMF signal generator 11. This audio output goes into the cellular phone instrument 14. At the same time phone call initiation is performed by state machine 3 by going from an On-Hook signal to the Off-Hook signal via cable 13 to the cellular phone instrument 14.

We shall now describe the process of initiating a phone call. The following table is presented in two side-by-side sections. The left section describes the action of the human operator, and the right section the reaction and activity of the state machine 3.

| OPERATOR | STATE MACHINE |
| --- | --- |
| 1. Pushes operator control once. | Starts timer. If no second control pulse is received within two seconds of the first pulse, operation is abandoned, based on the assumption that switch closure was accidental. |

| OPERATOR | STATE MACHINE |
| --- | --- |
| 2. Pushes operator control twice. | Recognizes "Speed Dialing" mode and responds with audio: "Ready to speed dial". Then it proceeds with more audio: "One", pause. "Two", pause, "Three", pause, etc. |
| 3. Pushes operator control twice during number "X" or contigous pause. | Recognizes desired telephone number stored in Speed Dial section of number storage unit 9. Continues with audio: "The number is XXX-XXXX. Push button to proceed". |
| 4. Pushes control once. | Issues appropriate controls to go Off=Hook, and generate DTMF signaling codes. Progress of call is audible on speaker. Telephone ringing tone commences. |
| 5. Continues call normally through eventual hang-up. | |
| 6. Pushes operator control three times. | Prepares to accept a NOT frequently dialed number. Responds with: "Ready to Dial", and continues: "Zero", pause, "One", pause, "Two", pause, etc. |
| 7. Pushes operator control once at proper number. | Recognizes that first digit was "X". Repeats once more: "Zero", pause, "One", pause, etc. |
| 8. Step 7. is repeated as often as is needed to dial all digits. | Recognizes subsequent digits, and stores in number storage 9. |
| 9. At the time of the last digit pushes operator control twice. | Recognizes last digit. Responds with audio: "The number is XXX=XXXX. Push button to proceed". |
| 10A. NO ACTION | After 5 seconds call is abandoned, presumption of error in dialing. |
| OR | |
| 10B. Pushes operator control once within allowable 5 second window. | Same as 4. above. |
| 11. Same as 5. | |

Note: Operator actions 3 or 7 are the stages during which the dialing controller acquires from the operator the information concerning the desired number. Specifically, as the state machine advances through the succesive states which result in the voicing of audio messages "One", "Two", etc., receipt by the state machine of an operator control input during or immediately after the voicing of a specific number is interpreted by the state machine that the operator has selected that number. Similarly, operator actions 3 or 9 (double operation of the control) tell the state machine that dialing is complete. The state machine does not stop there but immediately proceeds to the "Number presentation for Approval" phase, by causing the series of all selected numbers to be voiced in sequence. Following this, the operator has nominally 5 seconds to signify approval of the pending calling process by activating the control once in operator steps 4 or 10B, or the call will be abandoned.

In this prefered embodiment the operator must signal once or twice or three times as the case may be. Two signals are required to start the process and to indicate the last digit. Normal mode is "Speed Dial". Infrequently called numbers require three signals in step 6. Note that the cellular phone net with its expensive "on air" time is not involved until the operator is satisfied that the number to be dialed is correct.

The duration of the pause between pronouncement of each digit is adjustable by means of external pause control 15, which connects directly to state machine 3. An experienced operator needs less time than a novice.

Although an illustrative embodiment of the present invention has been described in detail with reference to the drawing, it is understood that the invention is not limited to this precise embodiment, and that various changes and modifications may be effected therein by one skilled in the art without departing from the scope or spirit of the invention.

What is claimed is:

1. A cellular car telephone dialing controller, for minimizing operator distraction by allowing hands-free, and no-eyes-required dialing operation, comprising:

an electrical switch conveniently mounted relative to a human operator, who is the driver of a vehicle, for producing actuation signals;

a state machine responsively connected to said electrical switch, said state machine being able to assume a current stable state which is one of a multiple stable states;

a pause control, responsively connected to said state machine; said pause control, in response to receiving a trigger signal from said state machine, returns a second signal to said state machine, thereby causing said state machine to change said current stable state to another one of said multiple stable states;

a stored voice response unit comprising means for converting digitized audio messages, previously stored in a electrically pre-programmed memory, to audio messages, said audio messages being specifically different from each other, whereas each of said audio messages corresponds to one of said multiple stable states, and when commanded by the state machine, said audio messages are made audible to the human operator via a speaker, the specific audio messages being issued at any specific time depends on said one of said multiple stable states assumed by said state machine;

a number storage unit, electrically connected to said state machine, for registering said current state of the state machine when commanded by the state machine;

a dual-tone multi-frequency signal generator for issuing conventional dialing signals to cellular telephone instrument when commanded by the state machine, whereas transmission of said dialing signals depends on number information supplied by said number storage unit, whereas said number information corresponds to information registered in said number storage unit;

said state machine is further used for:
   (a) decoding said actuation signals from said electrical switch by counting the number of actuation and their relative time, thereby changing said current stable state to a subsequent or previous state as a result of said decoding action;
   (b) issuing a first trigger signal to said pause control unit when said state machine assumes one of said multiple stable states;
   (c) issuing a second trigger signal accompanied by specific state information to said voice response unit when said state machine assumes one of said multiple stable states;
   (d) issuing a third trigger signal accompanied by specific state information to said number storage unit when said state machine assumes one of said multiple stable states;

(e) issuing a fourth trigger signal to said signal generator when said state machine assumes one of said multiple stable states;

(f) issuing Off-Hook and On-Hook signals to said cellular telephone instrument when said state machine assumes one of said multiple stable states.

2. The dialing controller as defined in claim 1 further being programmed so that one of the results of decoding said actuation signals is the initiation of a "Speed Dialing" mode, which permits access to often used phone numbers, pre-stored in said number storage unit, allowing the operator to initiate a phone call with fewer actions.

3. The dialing controller defined in claim 2 further being programmed so that said multiple stable states and corresponding "dialing" operation phases and corresponding digitized audio messages include numerals selected form a group comprising: "zero" to "nine", and prompt messages selected from a second group comprising essentially: "Ready to dial", "Ready to speed dial", "The number is", "Push button to proceed"; whereas said state machine registers, in said number storage unit, a specific "dialed" number if said electrical switch is activated while or immediately after a number is made audible by said stored voice response unit via said speaker.

4. The dialing controller defined in claim 3, further being programmed so that said sate machine does not respond to a first and single input signal from said electrical switch if followed by a predetermined amount of time, said first and single input signal is assumed to be generated by accidental operation of said switch.

5. The dialing controller defined in claim 4, wherein said pause control further comprises an second switch, controlled by said human operator, mounted external to the dialing controller to adjust the duration of pauses between audible numbers during a "dialing" process, to accommodate the experience level of the operator.

* * * * *